United States Patent
Izuoka

(10) Patent No.: US 11,254,301 B2
(45) Date of Patent: Feb. 22, 2022

(54) CONTROL DEVICE FOR HYBRID VEHICLE, CONTROL METHOD FOR HYBRID VEHICLE, AND RECORDING MEDIUM

(71) Applicant: TOYOTA JIDOSHA KABUSHIKI KAISHA, Toyota (JP)

(72) Inventor: Daisuke Izuoka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 140 days.

(21) Appl. No.: 16/571,284

(22) Filed: Sep. 16, 2019

(65) Prior Publication Data

US 2020/0156619 A1 May 21, 2020

(30) Foreign Application Priority Data

Nov. 16, 2018 (JP) .............................. JP2018-215997

(51) Int. Cl.
*B60W 20/12* (2016.01)
*B60W 20/11* (2016.01)
*B60W 20/20* (2016.01)
*B60W 40/04* (2006.01)
*B60W 50/00* (2006.01)

(52) U.S. Cl.
CPC ............ *B60W 20/12* (2016.01); *B60W 20/11* (2016.01); *B60W 20/20* (2013.01); *B60W 40/04* (2013.01); *B60W 2050/0075* (2013.01); *B60W 2556/10* (2020.02); *B60W 2556/50* (2020.02)

(58) Field of Classification Search
CPC ...... B60W 20/12; B60W 20/11; B60W 20/20; B60W 40/04

USPC ........................................................ 701/1, 22
See application file for complete search history.

(56) References Cited

U.S. PATENT DOCUMENTS

| 6,314,347 | B1 | 11/2001 | Kuroda et al. |
| 2010/0058848 | A1* | 3/2010 | Hamama ................... F01P 11/16 73/114.68 |
| 2015/0275788 | A1* | 10/2015 | Dufford .............. F02N 11/0837 701/102 |
| 2017/0120888 | A1 | 5/2017 | Jinno |

(Continued)

FOREIGN PATENT DOCUMENTS

| JP | 2007-306656 A | 11/2007 |
| JP | 2012-153257 A | 8/2012 |
| JP | 2013-159214 A | 8/2013 |

(Continued)

*Primary Examiner* — Isaac G Smith
(74) *Attorney, Agent, or Firm* — Oliff PLC

(57) ABSTRACT

A control device for a hybrid vehicle, includes a travel route creation unit creating a travel route from a starting point to a destination through a stopping point by referring to map information; a parking time period estimation unit estimating a parking time period of the hybrid vehicle at the stopping point; a travel load prediction unit predicting a traveling load of the hybrid vehicle in each of sections obtained by dividing the travel route by referring to the map information; and a travel mode setting unit setting, for each of the sections, a traveling mode of an EV mode, in which the battery provides power for traveling as a main power supply, or an HV mode, in which the internal combustion engine provides the power for traveling as the main power supply, on the basis of the parking time period and the traveling load.

9 Claims, 8 Drawing Sheets

(56) References Cited

U.S. PATENT DOCUMENTS

2018/0156095 A1\* 6/2018 Smith .................. B60W 20/40

FOREIGN PATENT DOCUMENTS

| JP | 2017-81416 A | 5/2017 |
|---|---|---|
| WO | 2015/198381 A1 | 12/2015 |

\* cited by examiner

CONTROL DEVICE FOR HYBRID VEHICLE, CONTROL METHOD FOR HYBRID VEHICLE, AND RECORDING MEDIUM

CROSS-REFERENCE TO RELATED APPLICATION(S)

The present application claims priority to and incorporates by reference the entire contents of Japanese Patent Application No. 2018-215997 filed in Japan on Nov. 16, 2018.

BACKGROUND

The present disclosure relates to a control device for a hybrid vehicle, a control, method for a hybrid vehicle, and a recording medium.

Hybrid vehicles provided with internal combustion engines and electric motors include control devices, and each of the control devices creates a travel plan by dividing a route from a starting point to a destination into a plurality of sections and assigning the sections with an EV mode in which an electric motor provides power for traveling or an HV mode in which an internal combustion engine and the electric motor provide power for traveling (for example, see Japanese Laid-open Patent Publication No. 2013-159214). In Japanese Laid-open Patent Publication No. 2013-159214, the EV mode or the HV mode is assigned to increase energy efficiency.

SUMMARY

There is a need for providing a control device for a hybrid vehicle, a control method for a hybrid vehicle, and a control program for a hybrid vehicle capable of creating an optimal travel plan even when a vehicle is parked at a stopping point.

According to an embodiment, a control device for a hybrid vehicle, the hybrid vehicle including: an internal combustion engine; a battery which is chargeable/dischargeable; and a rotary electric machine which is driven by power supplied from the battery, includes: a travel route creation unit creating a travel route from a starting point to a destination through a stopping point by referring to map information; a parking time period estimation unit estimating a parking time period of the hybrid vehicle at the stopping point; a travel load prediction unit predicting a traveling load of the hybrid vehicle in each of sections obtained by dividing the travel route by referring to the map information; and a travel mode setting unit setting, for each of the sections, a traveling mode of an EV mode, in which the battery provides power for traveling as a main power supply, or an HV mode, in which the internal combustion engine provides the power for traveling as the main power supply, on the basis of the parking time period and the traveling load.

According to an embodiment, a control method for a hybrid vehicle, the method being performed by a control device for a hybrid vehicle, the hybrid vehicle including an internal combustion engine, a battery which is chargeable/dischargeable, and a rotary electric machine which is driven by power supplied from the battery, includes: creating a travel route from a starting point to a destination through a stopping point by referring to map information; estimating a parking time period of the hybrid vehicle at the stopping point; predicting a traveling load of the hybrid vehicle in each of sections divided in the created travel route by referring to the map information; and setting, for each of the sections, a traveling mode of an EV mode, in which the battery provides power for traveling as a main power supply, or an HV mode, in which the internal combustion engine provides the power for traveling as the main power supply, on the basis of the parking time period and the traveling load.

According to an embodiment, a computer readable recording medium stores a control program for a control device of a hybrid vehicle, the hybrid vehicle including an internal combustion engine, a battery which is chargeable/dischargeable, and a rotary electric machine which is driven by power supplied from the battery, the control program causing the control device to execute: creating a travel route from a starting point to a destination through a stopping point by referring to map information; estimating a parking time period of the hybrid vehicle at the stopping point; predicting a traveling load of the hybrid vehicle in each of sections divided in the created travel route by referring to the map information; and setting, for each of the sections, a traveling mode of an EV mode, which the battery provides power for traveling as a main power supply, or an HV mode, it which the internal combustion engine provides the power for traveling as the main power supply, on the basis of the parking time period and the traveling load.

DETAILED DESCRIPTION OF THE PREFERRED EMBODIMENTS

Figure 1:
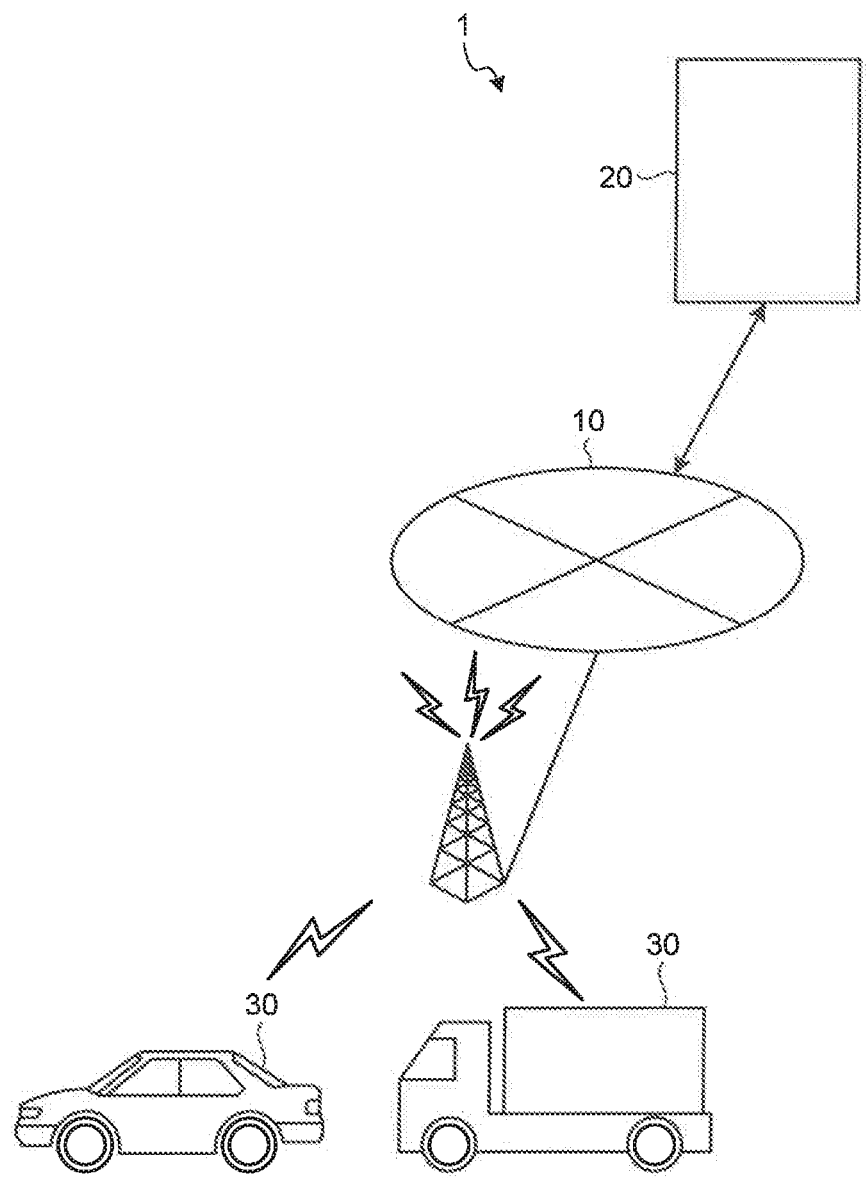
FIG. 1 is a schematic diagram illustrating a vehicle control system including a control device according to an embodiment of the present invention.

In the related art, in a case where one or more stopping points are set between a starting point and a destination or in a case of returning to a starting point after traveling from the starting point to a destination, a vehicle may be parked at the stopping point or the destination. In Japanese Laid-open Patent Publication No. 2013-159214, a parking time period at a stopping point or destination is not considered, and sometimes an optimal travel plan is not created depending on the parking time period.

An embodiment of the present invention will be described below with reference to the drawings. Note that, in all drawings of the following embodiment, the same or corresponding portions are denoted by the same reference numerals. Furthermore, the present invention is not limited to the embodiment described below.

Embodiment

Figure 2:
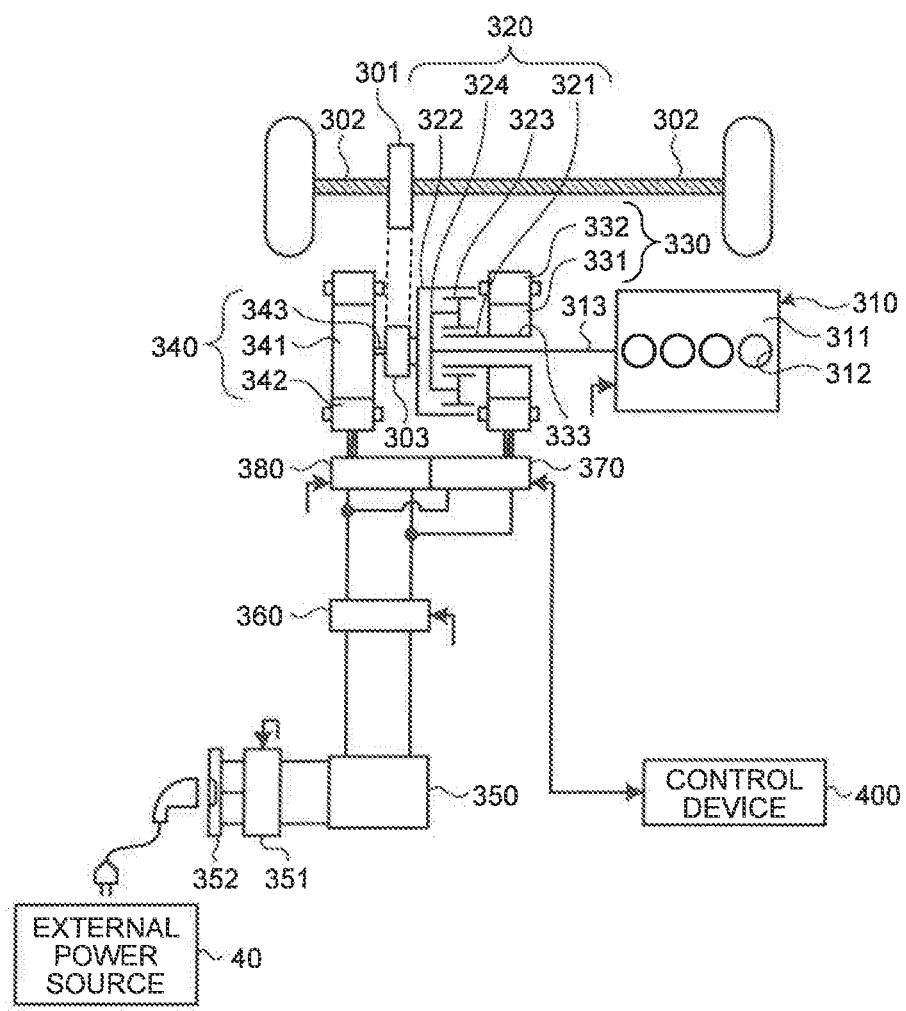
FIG. 2 is a diagram illustrating a schematic configuration of a vehicle according to an embodiment of the present invention.
Figure 3:
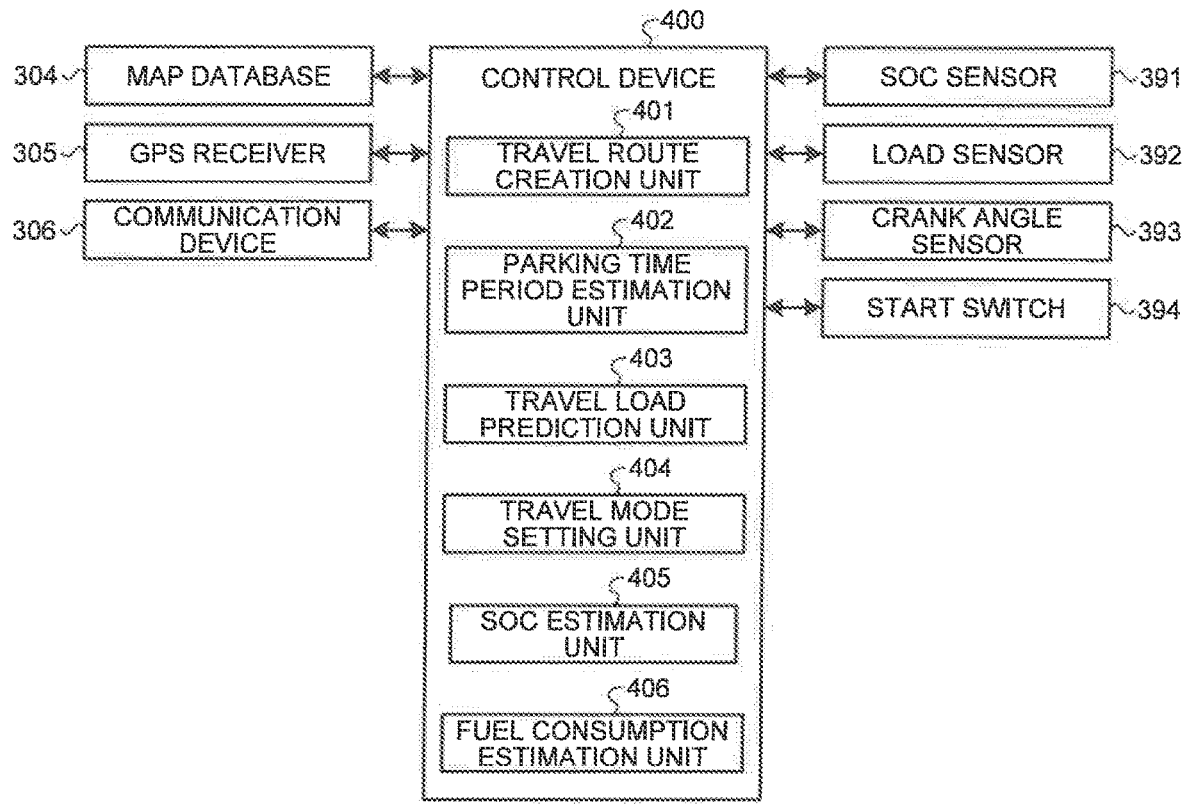
FIG. 3 is a block diagram illustrating a configuration of the control device for controlling the vehicle according to an embodiment of the present invention.

First, a vehicle control system including a control device according to an embodiment of the present invention will be described. FIG. 1 is a schematic diagram illustrating a vehicle control system including a control device according to an embodiment of the present invention. FIG. 2 is a diagram illustrating a schematic configuration of the vehicle according to the embodiment of the present invention. FIG. 3 is a block diagram illustrating a configuration of the control device for controlling the vehicle according to the embodiment of the present invention.

As illustrated in FIG. 1, a vehicle control system 1 according to the embodiment includes a server 20 and vehicles 30. In the vehicle control system 1 according to the embodiment, the server 20 and each of the vehicles 30 are communicably connected to each other via a network 10. Specifically, the server 20 and a control device 400 included in each vehicle 30 are communicably connected via the network 10. The network 10 includes the Internet network, a mobile phone network and the like which enable communication between the server 20 and the vehicle 30.

The server 20 acquires vehicle information on the speed and position of a vehicle from each vehicle 30 traveling. On the basis of the acquired vehicle information, the server 20 updates a congestion status of a road at that time and a parking time period (for example, average parking time period) in a facility. The server 20 includes one or a plurality of computers or the like including a central processing unit (CPU), a field programmable gate array (FPGA), a read only memory (ROM), and a random access memory (RAM).

Each vehicle 30 is a hybrid vehicle including an internal combustion engine 310, a power split mechanism 320, a first rotary electric machine 330, a second rotary electric machine 340, a battery 350, a boost converter 360, a first inverter 370, and a second inverter 380, and the vehicle 30 is configured to transmit power of one or both of the internal combustion engine 310 and the second rotary electric machine 340 to wheel drive shafts 302 via a final reduction gear 301. The vehicle 30 includes the control device 400 configured to control the vehicle 30 by driving control components. In addition to the internal combustion engine 310 and the control device 400, the vehicle 30 also includes a map database 304, a global positioning system (GPS) receiver 305, and a communication device 306.

The internal combustion engine 310 burns fuel in cylinders 312 formed in an engine body 311 to generate power for rotating an output shaft 313 connected to a crankshaft.

The power split mechanism 320 includes planetary gears for dividing power from the internal combustion engine 310 for two systems, that is, power for rotating each of the wheel drive shafts 302 and power for regeneratively driving the first rotary electric machine 330, and includes a sun gear 321, a ring gear 322, a pinion gear 323, and a planetary carrier 324.

The sun gear 321 is an external gear and is disposed at the center of the power split mechanism 320. The sun gear 321 is coupled to a rotation shaft 333 of the first rotary electric machine 330.

The ring gear 322 is an internal gear and is disposed around the sun gear 321 concentric with the sun gear 321. The ring gear 322 is coupled to the rotation shaft 333 of the second rotary electric machine 340. Furthermore, the ring gear 322 is integrally provided with a drive gear 303 configured to transmit the rotation of the ring gear 322 to the wheel drive shaft 302 via the final reduction gear 301.

The pinion gear 323 is an external gear and includes a plurality of pinion gears 323 which are disposed between the sun gear 321 and the ring gear 322 so as to mesh with the sun gear 321 and the ring gear 322.

The planetary carrier 324 is coupled to the output shaft 313 of the internal combustion engine 310 and rotates around the output shaft 313. The planetary carrier 324 is coupled also to each of the pinion gears 323 so that when the planetary carrier 324 rotates, each pinion gear 323 can rotates (revolves) around the sun gear 321 while rotating (rotating on the axis thereof).

The first rotary electric machine 330 is, for example, a two-phase alternating current synchronous motor generator and includes a rotor 331 mounted to an outer periphery of the rotation shaft 333 coupled to the sun gear 321 and having an outer periphery in which a plurality of permanent magnets is embedded, and a stator 332 on which an excitation coil for generating a rotating magnetic field is wound. The first rotary electric machine 330 has a function as an electric motor for acceleration drive in response to reception of power supply from the battery 350 and a function as a generator for regeneration drive in response to reception of power of the internal combustion engine 310.

In the present embodiment, the first rotary electric machine 330 is mainly used as a generator. When the output shaft 313 is rotated for cranking upon starting the internal combustion engine 310, the first rotary electric machine 330 is used as an electric motor and serves as a starter.

The second rotary electric machine 340 is, for example, a two-phase alternating current synchronous motor generator and includes a rotor 341 mounted to an outer periphery of a rotation shaft 343 coupled to the ring gear 322 and having an outer periphery in which a plurality of permanent magnets is embedded, and a stator 342 on which an excitation coil for generating a rotating magnetic field is wound. The second rotary electric machine 340 has a function as an electric motor for acceleration drive in response to reception of power supply from the battery 350 and a function as a generator for regeneration drive in response to reception of power from the wheel drive shaft 302 upon deceleration of the vehicle.

The battery 350 is a chargeable/dischargeable secondary battery, such as a nickel-cadmium storage battery, a nickel-hydrogen storage battery, or a lithium ion battery. In the present embodiment, as the battery 350, a lithium ion secondary battery whose rated voltage is approximately 200 v is used. The battery 350 is electrically connected to the first rotary electric machine 330 and the second rotary electric machine 340 via the boost converter 360 or the like so as to supply power charged in the battery 350 to the first rotary electric machine 330 and the second rotary electric machine 340 for acceleration drive thereof, and further, so as to charge power generated by the first rotary electric machine 330 and the second rotary electric machine 340 in the battery 350.

Furthermore, the battery 350 is configured to be electrically connected to an external power source 40 via a charge control circuit 351 and a charging inlet lid 352, for charging from the external power source 40, such as a home outlet. The vehicle 30 according to the present embodiment is a so-called plug-in hybrid vehicle. The charge control circuit 351 is an electric circuit capable of converting an alternating current supplied from the external power source 40 into a direct current, on the basis of a control signal from the control device 400, boosting an input voltage to a battery voltage, and charging power from the external power source 40 in the battery 350.

The boost converter 360 includes an electric circuit capable of boosting the voltage between primary side terminals on the basis of a control signal from the control device 400 and outputting the boosted voltage from secondary side terminals or reducing the voltage between the secondary side terminals on the basis of a control signal from the control device 400 and outputting the reduced voltage from the primary side terminals. The primary side terminals of the boost converter 360 are connected to output terminals of the battery 350, and the secondary side terminals are connected to DC terminals of the first inverter 370 and the second inverter 380.

Each of the first inverter 370 and the second inverter 380 includes an electric circuit capable of converting direct current input from the DC terminal on the basis of a control signal from the control device 400 into alternating current (two-phase alternating current in the present embodiment) and outputting the alternating current from an AC terminal or converting an alternating current input from an AC terminal into direct current on the basis of a control signal from the control device 400 and outputting the direct current from a DC terminal. The DC terminal of the first inverter 370 is connected to a secondary side terminal of the boost converter 360, and the AC terminal of the first inverter 370 is connected to an input/output terminal of the first rotary electric machine 330. The DC terminal of the second inverter 380 is connected to a secondary side terminal of the boost converter 360, and the AC terminal of the second inverter 380 is connected to an input/output terminal of the second rotary electric machine 340.

The map database 304 is a database relating to map information. The map database 304 is stored, for example, in a hard disk drive (HDD) mounted to a vehicle. The map information includes various road information, such as road position information, road shape information (for example, road gradient, types of curve and straight section, and traveling load such as curve curvature), position information about intersections and junctions, road types, and speed limit. Under the control of the control device 400, the map database 304 acquires the latest road information from the server 20 and updates the information.

The GPS receiver 305 receives signals from three or more GPS satellites, identifies the latitude and longitude of the vehicle 30, and detects the current position of the vehicle 30.

The UPS receiver 305 transmits information about the detected current position of the vehicle 30 to the control device 400.

The communication device 306 is connected to the network 10 to communicate with the server 20. The communication device 306 transmits the vehicle information to the server 20 or acquires information on the parking time period at a facility or the like, from the server 20.

The control device 400 includes one or a plurality of computers and the like including a CPU, an FPGA, a ROM, a RAM and the like. The control device 400 controls the vehicle 30 by driving control components on the basis of output signals or the like input from various sensors.

The control device 400 switches traveling modes between an electric vehicle (EV) mode and a hybrid vehicle (HV) mode to cause the vehicle 30 to travel.

In the EV mode, power charged in the battery 350 is preferentially used to cause acceleration drive of the second rotary electric machine 340, and at least the power of the second rotary electric machine 340 is transmitted to the wheel drive shaft 302 to cause the vehicle 30 to travel. In a case where the EV mode is employed, the control device 400 causes acceleration drive of the second rotary electric machine 340 by using power charged in the battery 350 basically while the internal combustion engine 310 is stopped, causes the wheel drive shaft 302 to rotate by using only the power of the second rotary electric machine 340, and causes the vehicle 30 to travel.

On the other hand, in the HV mode, the internal combustion engine 310 is operated, power generated by the first rotary electric machine 330 is preferentially used to cause acceleration drive of the second rotary electric machine 340, and the power of both of the internal combustion engine 310 and the second rotary electric machine 340 is transmitted to the wheel drive shaft 302 to cause the vehicle 30 to travel. In a case where the HV mode is employed, the control device 400 divides the power of the internal combustion engine 310 into two systems by using the power split mechanism 320, power of the internal combustion engine 310 divided for one system is transmitted to the wheel drive shafts 302, and power divided for the other system causes regeneration drive of the first rotary electric machine 330. Then, the control device 400 basically causes acceleration drive of the second rotary electric machine 340 with power generated by the first rotary electric machine 330 and transmits the power from the second rotary electric machine 340, in addition to the power of the internal combustion engine 310 divided for the one system, to the wheel drive shafts 302 to cause the vehicle 30 to travel.

Thus, in a case of a hybrid vehicle having traveling modes switchable between the EV mode and the HV mode, the EV mode is desirably set preferentially to reduce the fuel consumption, as long as a battery charge amount is sufficient.

Meanwhile, the internal combustion engine 310 has a heat efficiency which is likely to decrease as the traveling load decreases. Therefore, for example, in a traveling section requiring frequent starting and stopping or low speed traveling, such as a traveling section which has many traffic signals, heavy traffic, congestion or the like, the HV mode is desirably set to cause the vehicle 30 to travel.

In a traveling section enabling traveling in an engine load region having a good heat efficiency, such as a traveling section enabling continuous steady traveling while maintaining a vehicle speed of a certain level or more, the traveling mode is desirably set to the HV mode to cause the vehicle 30 to travel.

Therefore, in a case of a hybrid vehicle having the traveling modes switchable between the EV mode and the HV mode, to suppress fuel consumption required for traveling, it is effective to previously create a travel plan indicating which traveling section of a predicted route from a starting point to a destination through a stopping point the vehicle travels in the EV mode, and switch the travel modes according to the travel plan.

The control device 400 includes a travel route creation unit 401, a parking time period estimation unit 402, a travel load prediction unit 403, a travel mode setting unit 404, an SOC estimation unit 405, and a fuel consumption estimation unit 406.

The travel route creation unit 401 sets a predicted route of a vehicle on the basis of the current position information about the vehicle 30 detected by the GPS receiver 305, map information of the map database 304, a destination set by an occupant of the vehicle 30 and the like and creates travel route information on the set predicted route.

Figure 4:
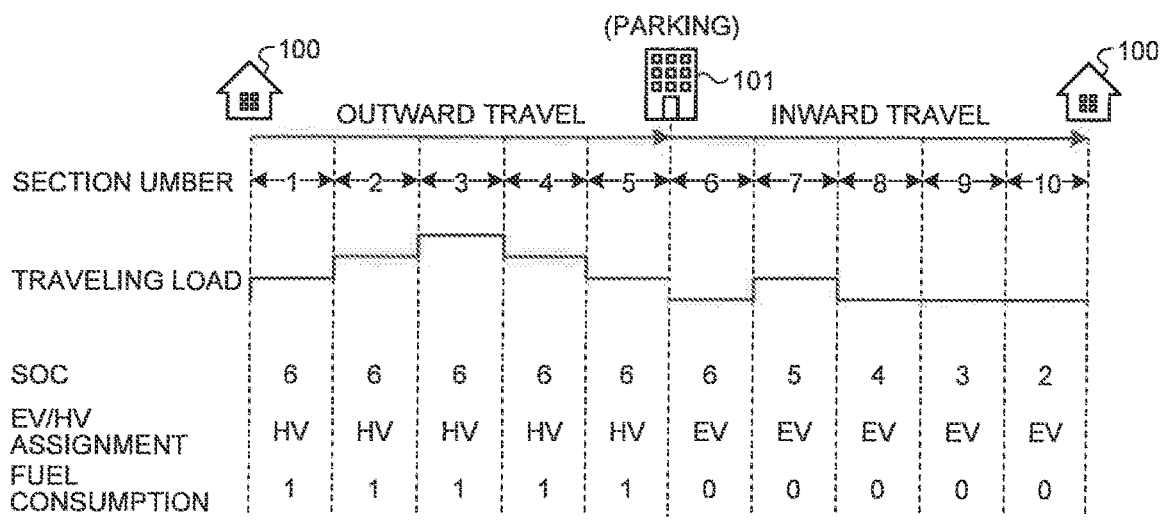
FIG. 4 is a diagram illustrating an example of travel route creation performed by a travel route creation unit included in the control device according to an embodiment of the present invention.

FIG. 4 is a diagram illustrating an example of travel route creation performed by the travel route creation unit included in the control device according to an embodiment of the present invention. For example, as illustrated in FIG. 4, when leaving a home 100 and returning to the home 100 through a stopping point 101, the travel route creation unit 401 creates a travel route (outward travel) from the home 100 to the stopping point 101 and a travel route (inward travel) from the stopping point 101 to the home 100. Note that the vehicle 30 is parked at the stopping point 101. Furthermore, the outward travel and the inward travel, leaving the home 100 and returning to the home 100 through the stopping point 101, are each divided into a plurality of sections. For example, in FIG. 4, the outward travel and the inward travel are totally divided into ten sections, and the sections are designated by section numbers (1 to 10).

The parking time period estimation unit 402 estimates a parking time period at the stopping point. The parking time period estimation unit 402 predicts, for example, a probability of long time parking (LTP) at the stopping point by using a Bayesian network probability model shown in the following formula (1). Here, the long time represents a time period longer than a time period preset as a parking time period of the vehicle 30. Hereinafter, estimation processing using the Bayesian network probability model may be simply referred to as "Bayesian estimation".

Mathematical Formula 1

$$P(LTP \mid x1, x2, x3, \ldots, xn) = \frac{P(LTP) * \prod_{j=1}^{n} P(xj \mid LTP)}{P(LTP) * \prod_{j=1}^{n} P(xj \mid LTP) + P(\overline{LTP}) * \prod_{j=1}^{n} P(xj \mid \overline{LTP})} \quad (1)$$

Here, P (LTP| x1, x2, x3, . . . , xn) represents the probability of long time parking when mutually independent conditions x1, x2, x3, . . . , xn are simultaneously satisfied. The conditions x1, x2, x3, . . . , xn are parameters different from each other and include, for example, a traveling position, a time slot, a day of the week and the like.

In the term of the numerator on the right side, the probability of long time parking is multiplied by a probability of satisfying the condition xj (j=1 to n) during the long time parking.

Furthermore, the first term of the denominator on the right side is the same as the term of the numerator. In the second term of the demonstrator, the probability of non-long time parking is multiplied by a probability of satisfying the condition xj (j=1 to n) during the non-long time parking.

In addition, in formula (1), a parameter which is estimated to be highly correlated with the parking time period may be appropriately added from learning data.

The parking time period estimation unit 402 calculates probabilities of long time parking for different time periods, and then determines a parking time period on the basis of the calculated probability and a preset probability threshold. The above estimation process is an example, and another known method may be used to estimate the parking time period.

The travel load prediction unit 403 refers to the map database 304, extracts information on a road shape of a travel route created by the travel route creation unit 401 or a congestion status in a traveling time slot, and predicts a traveling load in the travel route. The travel load prediction unit 403 divides the travel route into a plurality of sections and provides each section with a load value which increases as the traveling load increases. The travel load prediction unit 403 calculates the traveling loads in the sections, for example, by adding the load values of traveling corresponding to the gradient or congestion status of the road. Each of the load values is previously set according to a load on the vehicle 30. For example, as the congestion status, a congestion degree is given which is set in advance according to the number of vehicles traveling in a set range, and the congestion degree increases as the number of vehicles increases.

The travel mode setting unit 404 sets the traveling mode for each section to the EV mode or the HV mode on the basis of the traveling load. For example, the travel mode setting unit 404 sets the HV mode to a section having a higher traveling load and sets the EV mode to a section having a relatively low traveling load. Note that a traveling mode may be set in consideration of the remaining capacity of the battery 350.

The SOC estimation unit 405 estimates a state of charge (SOC) determined by remaining capacity (Ah)/full charge capacity (Ah)×100 and calculates a standardized estimated value. The SOC estimation unit 405 predicts a discharge rate accords ng to the traveling mode or the traveling load and calculates a charging rate from the predicted discharge rate. The SOC estimation unit 405 calculates an estimated value of 6 to 0 assuming that a fully charged state is 6 and a non-charged state is 0. In the example of FIG. 4, when the traveling mode is switched to the EV mode, power is supplied from the battery 350, and thus, the SOC (estimated value) decreases.

The fuel consumption estimation unit 406 estimates an amount of fuel consumed for driving of the vehicle 30. Specifically, when the internal combustion engine 310 is driven in the HV mode, the fuel consumption estimation unit 406 estimates an amount of fuel consumed, on the basis of a traveling load, distance, charging rate (SOC) and the like and calculates the amount of fuel consumed. The fuel consumption estimation unit 406 calculates a standardized fuel consumption. For example, as illustrated in FIG. 4, the fuel consumption estimation unit 406 calculates the fuel consumption based on a unit consumption which is set to 1 in advance.

Furthermore, to the control device 400, output signals from various sensors are input, where the various sensors include an SOC sensor 391 configured to detect a battery charge amount, a load sensor 392 configured to generate output voltage proportional to an amount of depression of an accelerator pedal, a crank angle sensor 393 configured to generate an output pulse as a signal for calculation of an engine rotation speed and the like each time the crankshaft of the engine body 311 rotates, for example, by 15°, and a start switch 394 configured to determine activation and stop of the vehicle 30 and the like.

Figure 5:
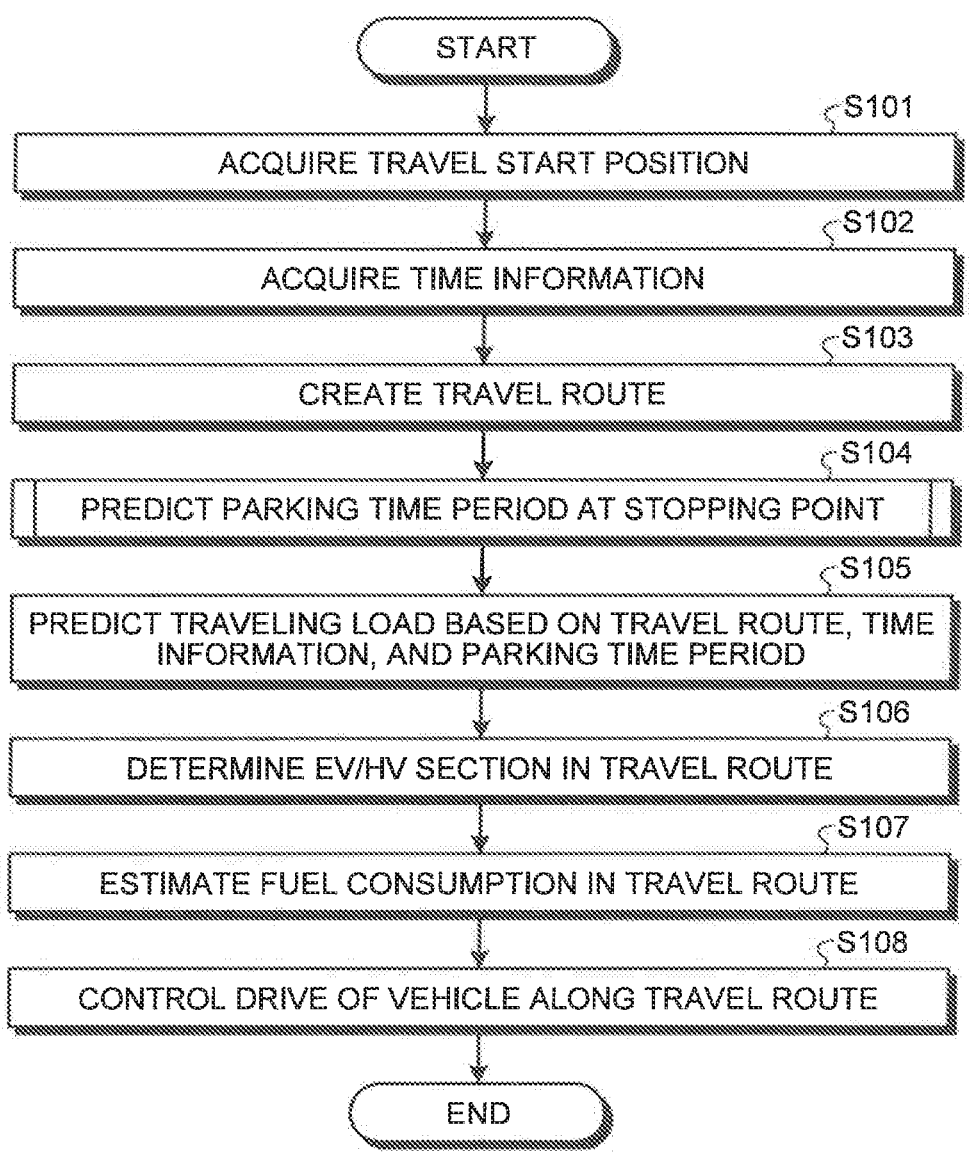
FIG. 5 is a flowchart illustrating a travel plan creation process performed by the control device according to an embodiment of the present invention.

Next, a travel plan creation process performed by the control device 400 of the vehicle control system 1 will be described with reference to FIG. 5. FIG. 5 is a flowchart illustrating the travel plan creation process performed by the control device according to an embodiment of the present invention. The process of FIG. 5 starts, for example, after the vehicle 30 is driven.

The control device 400 acquires a travel start position (Step S101). The control device 400 acquires current position information of a vehicle 30 detected by the GPS receiver 305.

Thereafter, the control device 400 acquires, from the server 20 or the map database 304, time information including congestion prediction information or traffic restriction information from a current time until after a predetermined time has elapsed (Step S102).

Thereafter, the travel route creation unit 401 creates a travel route (Step S103). The travel route creation unit 401 sets a predicted route of a vehicle on the basis of the current position information about the vehicle 30 detected by the GPS receiver 305, map information of the map database 304, a destination set by an occupant of the vehicle 30 and the like and creates travel route information on the set predicted route.

Figure 6:
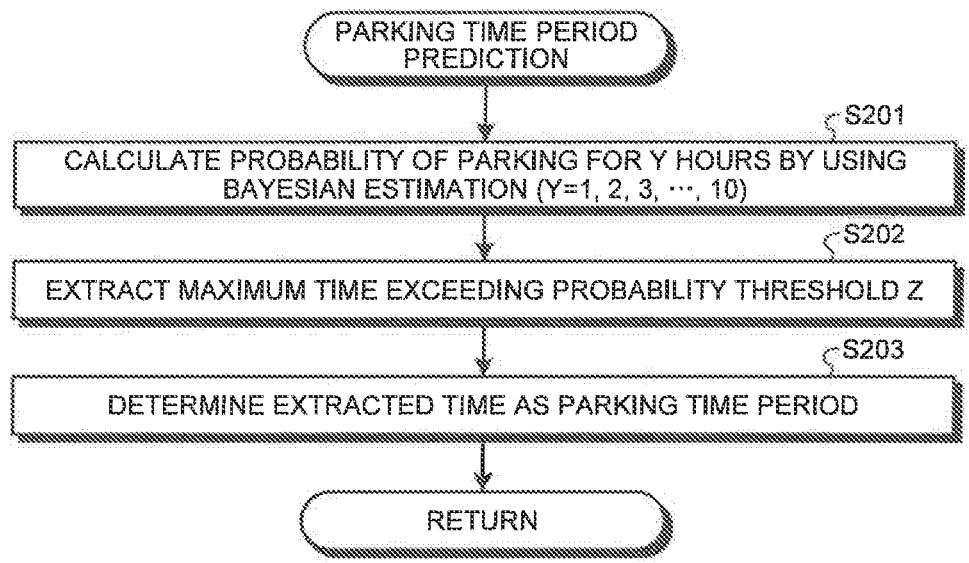
FIG. 6 is a flowchart illustrating a parking time period estimation process performed by a parking time period estimation unit of the control device according to an embodiment of the present invention.

The parking time period estimation unit 402 estimates a parking time period at a stopping point (Step S104). Hereinafter, a parking time period estimation process performed by the parking time period estimation unit 402 will be described with reference to FIGS. 6 and 7. FIG. 6 is a flowchart illustrating the parking time period estimation process performed by the parking time period estimation unit of the control device according to an embodiment of the present invention.

The parking time period estimation unit 402 predicts the probability of long time parking (LTP) at the stopping point by using the Bayesian network probability model shown in the above formula (1). The parking time period estimation unit 402 calculates a probability of parking for a time period Y or more by using the above formula (1) (Step S201). Here, the time period Y set in the present embodiment is Y=1, 2, 3, . . . , (h). The parking time period estimation unit 402 calculates probabilities of LTP for different time periods using the above formula (1). The time period Y may be set as, for example, 30 minutes (0.5 h) on the basis of past parking time period information. Furthermore, the maximum value of the time period Y may be set on the basis of the past parking time period information, in the same manner.

After calculating the probabilities of LTP for different time periods, the parking time period estimation unit 402 extracts the longest time period from among time periods exceeding a probability threshold Z (Step S202). The probability threshold Z is a value of a preset probability. The probability threshold Z may be determined each time on the basis of the past parking time period information.

Figure 7:
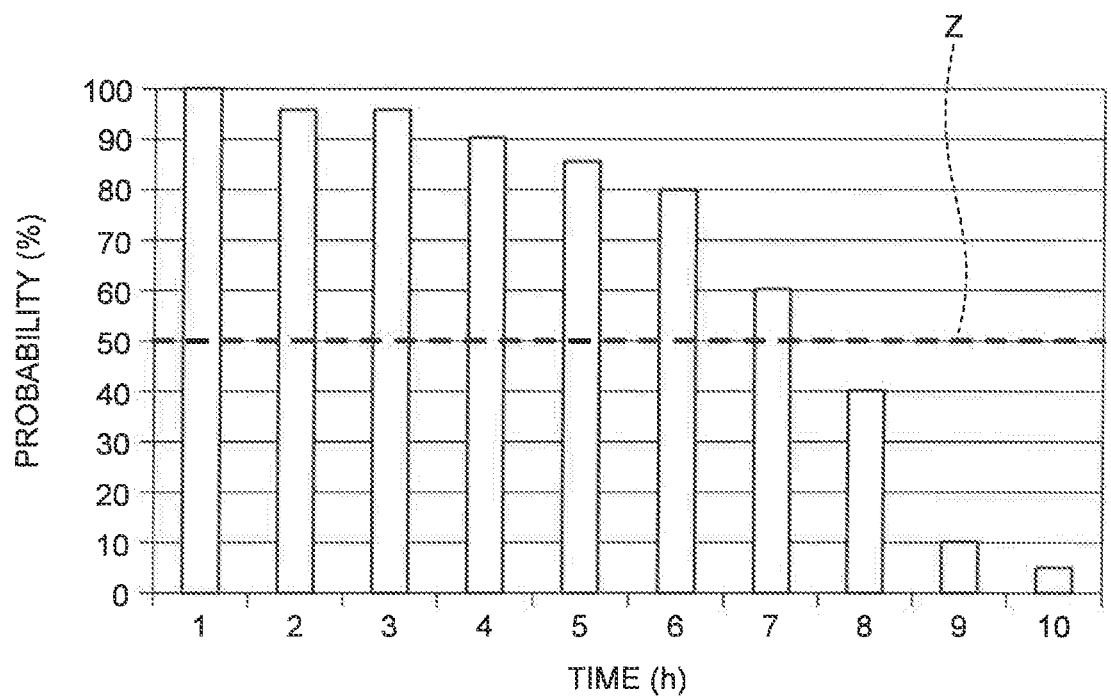
FIG. 7 is a graph illustrating an example of the parking time period estimation process performed by the parking time period estimation unit of the control device according to an embodiment of the present invention.

FIG. 7 is a graph illustrating an example of the parking time period estimation process performed by the parking time period estimation unit of the control device according to an embodiment of the present invention. The parking time period estimation unit 402 extracts the maximum time period from the time periods exceeding the probability threshold Z on the basis of the probabilities calculated for different time periods (time period Y). In the example of FIG. 7, Y=7 is extracted.

The parking time period estimation unit 402 determines the extracted time as the parking time period at the stopping point (Step S203). In the example of FIG. 7, the estimated parking time period is determined as seven hours. As described above, the parking time period estimation unit 402 estimates the parking time period of the vehicle 30 at the stopping point.

Note that steps S103 and S104 may be reversed or may be performed simultaneously.

Returning back to FIG. 5, the travel load prediction unit 403 predicts a traveling load in the travel route (Step S105). The travel load prediction unit 403 divides the travel route into a plurality of sections, refers to the map database 304, extracts information on a road shape of the travel route created by the travel route creation unit 401, a congestion status of a traveling time slot in the outward travel, and a congestion status of a driving time slot in the inward travel after parking, and predicts a traveling load in the travel route.

In Step S106 after Step S105, the travel mode setting unit 404 sets the traveling mode for each section to the EV mode or HV mode on the basis of the traveling load (see FIG. 4).

In Step S107 after Step S106, the fuel consumption estimation unit 406 estimates an amount of fuel consumed for the driving of the vehicle 30. Note that a result of the estimation performed by the fuel consumption estimation unit 406 may be fed back to the travel mode setting unit 404 so that the travel mode setting unit 404 resets the traveling mode on the basis of the result of the estimation.

Then, the control device 400 causes the vehicle to travel according to the created travel route (Step S108). Specifically, the control device 400 acquires the current position information of the vehicle 30 detected by the GPS receiver 305 and causes the vehicle 30 to travel in a traveling mode (the EV mode or HV mode) corresponding to each traveling section including the position information.

In the present embodiment described above, in a case where a stopping point is set between the starting point and the final destination, the parking time period estimation unit 402 estimates the parking time period at the stopping point, and the travel load prediction unit 403 predicts the traveling load on the basis of the estimated parking time period, and the travel mode setting unit 404 sets a traveling mode of the EV/HV mode, and thus, an optimal travel plan including the parking time period can be created. According to the present embodiment, it is possible to suppress the amount of fuel consumed by creating the optimal travel plan and cause the vehicle 30 to travel.

First Modification

Figure 8:
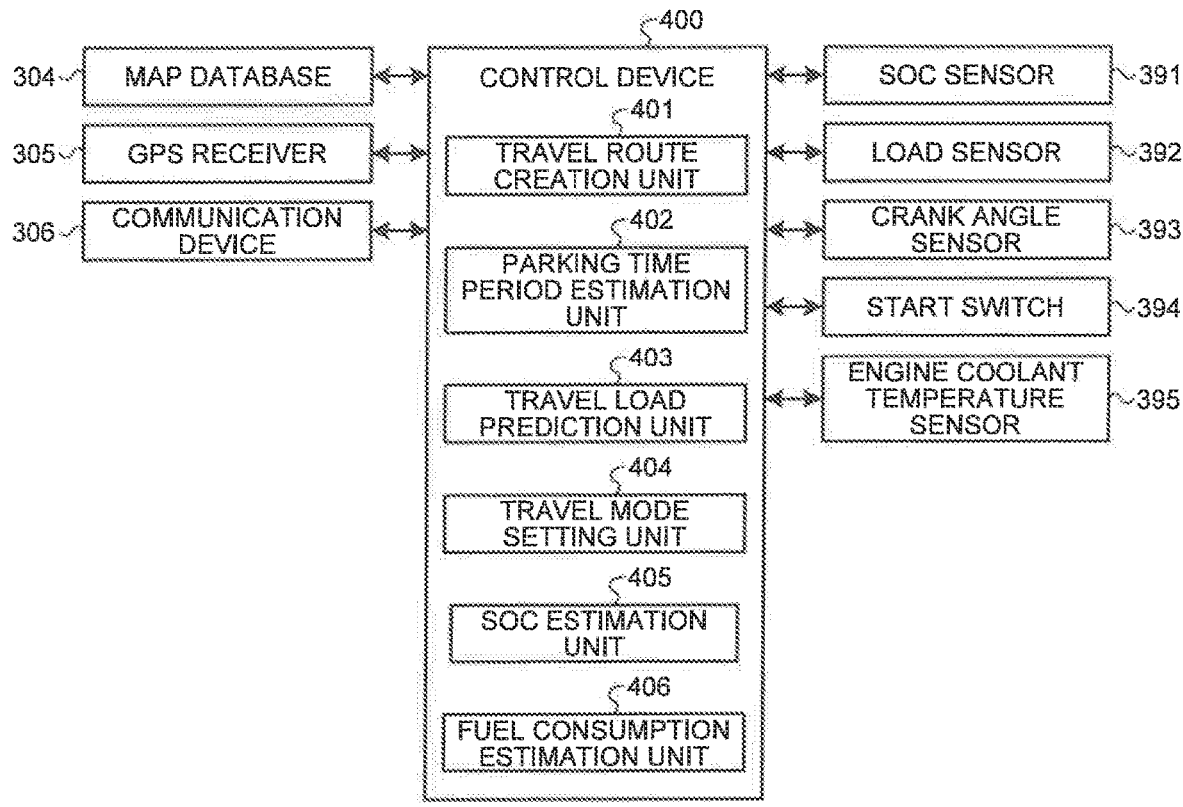
FIG. 8 is a block diagram illustrating a configuration of a control device for controlling the vehicle according to a first modification of the embodiment of the present invention.

Next, a first modification of the present embodiment will be described with reference to FIGS. 8 to 10. FIG. 8 is a block diagram illustrating a configuration of a control device for controlling a vehicle according to a first modification of the embodiment of the present invention. In a vehicle control system according to the first modification, the control device 400 described above acquires a result of detection of coolant temperature from an engine coolant temperature sensor 395. This coolant temperature represents the temperature of fluid (hereinafter may be referred to as the "engine coolant temperature") passing through the internal combustion engine 310, heated by heat emitted from the internal combustion engine 310, and supplied to a heater core, heat accumulated in the fluid heats air from a blower fan, and the heated air is supplied into the vehicle. The configuration other than this description is the same as that of the vehicle control system 1 described above, and the description thereof will be omitted.

Figure 9:
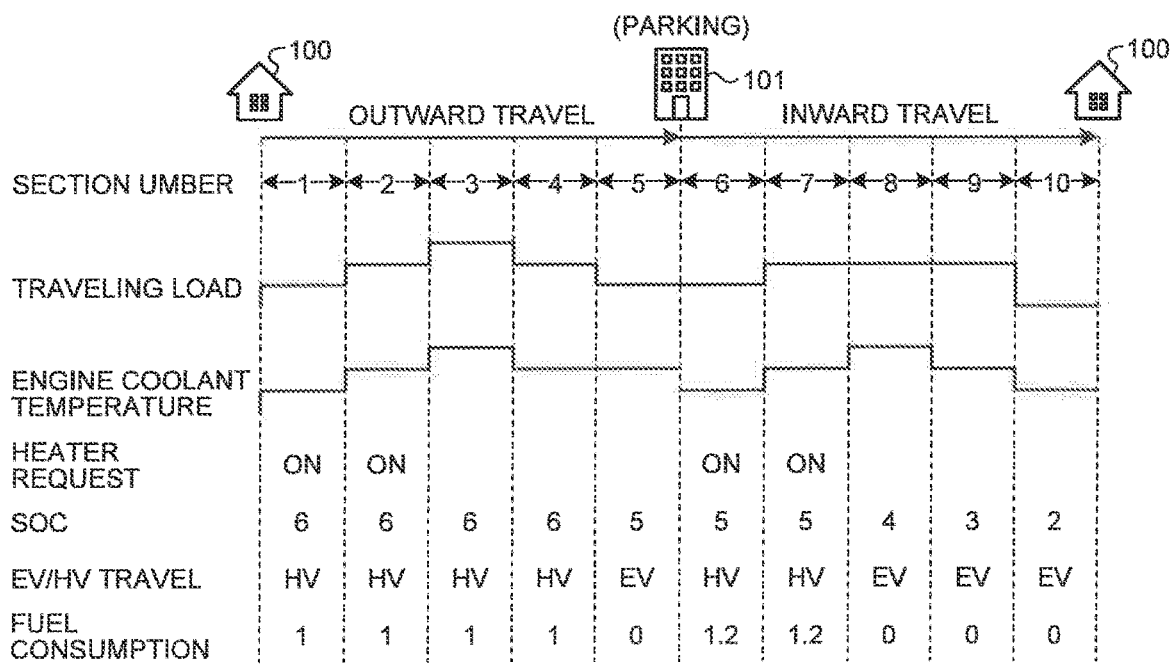
FIG. 9 is a diagram illustrating an example of a travel plan created when a heater request is made and a parking time period prediction is made.

FIG. 9 is a diagram illustrating an example of a travel plan created when a heater request is made and a parking time period prediction is made. For example, as illustrated in FIG. 9, when leaving a home 100 and returning to the home 100 through a stopping point 101, the travel route creation unit 401 creates a travel route (outward travel) from the home 100 to the stopping point 101 and a travel route (inward travel) from the stopping point 101 to the home 100. Note that the vehicle 30 is parked at the stopping point 101.

For example, in a case where a heater is turned on in winter upon leaving the starting point or the stopping point, the engine coolant temperature at the start of traveling becomes important. When the engine coolant temperature at the start of traveling is low, the heater request is input to raise the temperature of the coolant. At this time, the control device 400 sets a traveling mode to the NV mode and causes the internal combustion engine 310 to operate to heat the coolant.

In a case where the heater request is expected to be input upon estimation of the parking time period, the parking time period estimation unit 402 fixes the time period Y or probability threshold Z described above to a value, which is set corresponding to the heater request, and estimates the parking time. In addition, it is possible to change the setting appropriately with respect to the fixed time period Y or probability threshold Z.

The travel mode setting unit 404 predicts the coolant temperature at the time of leaving the stopping point, on the basis of a result of the estimation performed by the parking time period estimation unit 402, and sets the EV mode/HV mode. Specifically, the travel mode setting unit 404 compares the estimated parking time period with a threshold value set in advance for the parking time period, and when the parking time period is larger than the threshold value, the HV mode is set in the vicinity of the stopping point in the outward travel. This configuration maintains the engine coolant temperature during parking. The threshold value is set, for example, on the basis of whether the engine coolant temperature lowers before leaving the stopping point. In FIG. 9, the HV mode is set to sections immediately before the stopping point. Moreover, external temperature (predicted value) may be added as a parameter for prediction of the engine coolant temperature.

Figure 10:
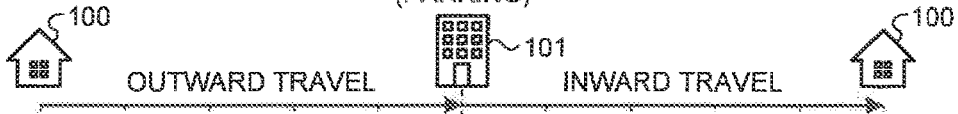
FIG. 10 is a diagram illustrating an example of a travel plan created when the heater request is made and no parking time period prediction is made.

FIG. 10 is a diagram illustrating an example of a travel plan created when the heater request is made and no parking time period prediction is made. When setting a traveling mode without performing the parking time period prediction, the time of leaving the stopping point cannot be predicted, and the engine coolant temperature at the leaving time from the stopping point also becomes unknown. Therefore, a traveling mode suppressing a decrease in engine coolant temperature cannot also be set by the travel mode setting unit 404, and thus, the number of sections requiring the heater request in the inward travel increases compared with a travel plan with the parking time period prediction, leading to extra consumption of fuel.

In the examples of FIGS. 9 and 10, a total fuel consumption in the outward travel and the inward travel is 6.4 when the parking time period prediction is performed but is 7.5 when the parking time period prediction is not performed, and thus, it is considered that the total fuel consumption can be suppressed when the parking time period prediction is performed. In sections 6 to 8, the total fuel consumption is calculated assuming that a fuel consumption required when SOC is 5 increases by 0.2 per section, and the fuel consumption required when SOC is 4 increases by 0.5 per section.

In the first modification described above, in a case where a stopping point is set between the starting point and the final destination, the parking time period estimation unit 402 estimates the parking time period at the stopping point, and the travel mode setting unit 404 sets the EV/HV travel mode on the basis of the estimated parking time period and adjusts the engine coolant temperature until reaching the stopping point, and thus, an optimal travel plan including the parking time period can be created and an input of the heater request can be suppressed. According to the first modification, it is possible to suppress fuel consumption when using the heater.

Second Modification

Figure 11:
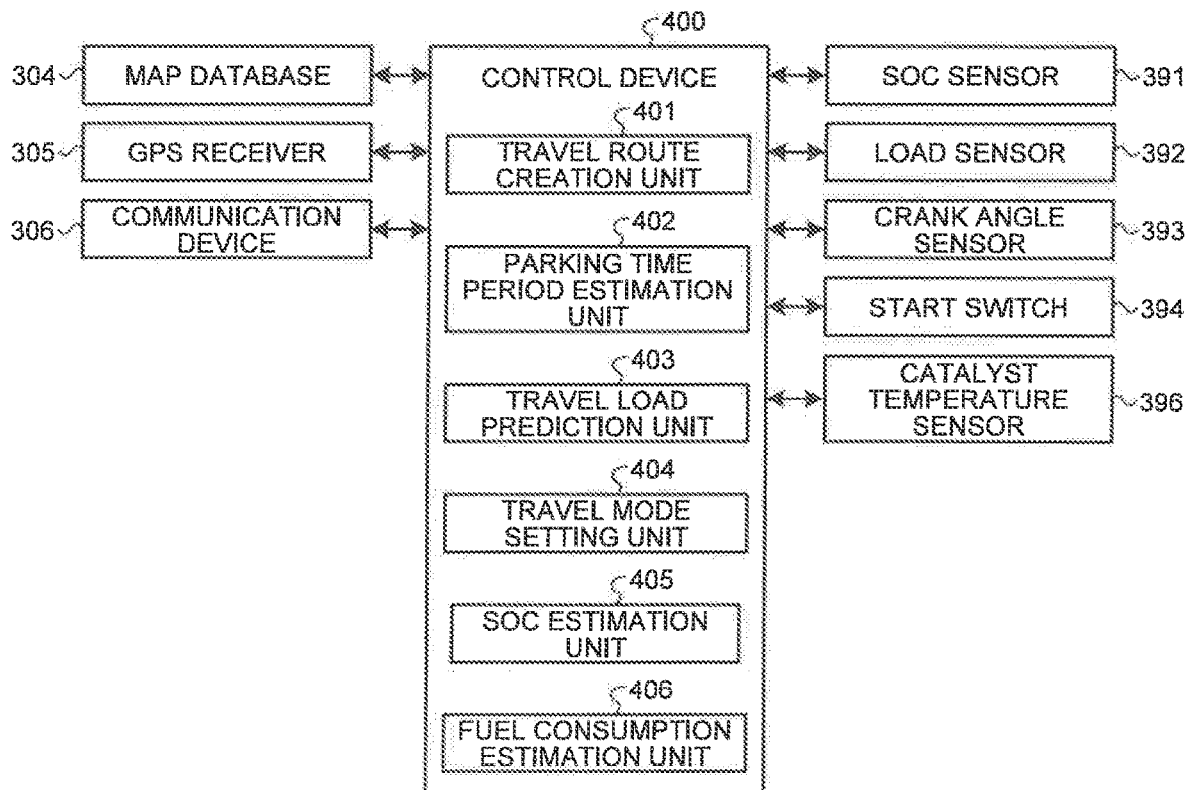
FIG. 11 is a block diagram illustrating a configuration of a control device for controlling a vehicle according to a second modification of the embodiment of the present invention.

Next, a second modification of the present embodiment will be described with reference to FIGS. 11 to 13. FIG. 11 is a block diagram illustrating a configuration of a control device for controlling a vehicle according to the second modification of the embodiment of the present invention. In a vehicle control system according to the second modification, the control device 400 described above acquires a result of detection of catalyst temperature from a catalyst temperature sensor 396. The catalyst exhibits a function of purifying a harmful gas in a gas exhausted from the vehicle 30 when reaching a temperature equal to or higher than a predetermined temperature. The catalyst is heated by heat generated by the operation of the internal combustion engine 310. The configuration other than this description is the same as that of the vehicle control system 1 described above, and the description thereof will be omitted.

Figure 12:
FIG. 12 is a diagram illustrating an example of a travel plan created when a catalyst warm-up request is made and the parking time period prediction is made.

FIG. 12 is a diagram illustrating an example of a travel plan created when a catalyst warm-up request is made and a parking time period prediction is made. For example, as illustrated in FIG. 12, when leaving a home 100 and returning to the home 100 through a stopping point 101, the travel route creation unit 401 creates a travel route (outward travel) from the home 100 to the stopping point 101 and a travel route (inward travel) from the stopping point 101 to the home 100. Note that the vehicle 30 is parked at the stopping point 101.

For example, in a case of traveling again after arrival at the stopping point, a catalyst warm-up request is turned on, when the catalyst needs to be overheated upon leaving the stopping point. At this time, the control device 400 sets the HV mode as a driving mode and causes the internal combustion engine 310 to operate to heat the catalyst.

In a case where the catalyst warm-up request is expected to be input upon estimation of a parking time period, the parking time period estimation unit 402 fixes the time period Y or probability threshold Z described above to a value, which is set corresponding to the catalyst warm-up request, and estimates the parking time. In addition, it is possible to change the setting appropriately with respect to the fixed time period Y or probability threshold Z.

The travel mode setting unit 404 predicts the catalyst temperature at the time of leaving the stopping point, from a result of the estimation performed by the parking time period estimation unit 402, and sets the EV mode/HV mode. Specifically, the travel mode setting unit 404 compares the estimated parking time period with a threshold value set in advance for the parking time period, and when the parking time period is smaller than the threshold value, the HV mode is set in the vicinity of the stopping point in the outward travel. As the threshold value, for example, a time period during which the temperature of the catalyst can be maintained at 50° C. or higher at the time of leaving the stopping point. This configuration maintains the catalyst temperature during parking. In FIG. 12, the HV mode is set to sections immediately before the stopping point. Moreover, external temperature (predicted value) may be added as a parameter, for prediction of the catalyst temperature.

Figure 13:
FIG. 13 is a diagram illustrating an example of a travel plan created when the catalyst warm-up request is made and no parking time period prediction is made.

FIG. 13 is a diagram illustrating an example of a travel plan created when a catalyst warm-up request is made and no parking time period prediction is made. When setting a traveling mode without performing the parking time period prediction, the time of leaving the stopping point cannot be predicted, and the catalyst temperature at the leaving time from the stopping point also becomes unknown. Therefore, a traveling mode suppressing a decrease in catalyst temperature cannot also be set by the travel mode setting unit 404, and thus, the number of sections requiring the catalyst warm-up request in the inward travel increases compared with a travel plan with the parking time period prediction, leading to extra consumption of fuel.

In the examples of FIG. 12 and FIG. 13, a total fuel consumption in the outward travel and the inward-travel is 9.7 when the parking time period prediction is performed but is 9.9 when the parking time period prediction is not performed, and thus, it is considered that the total fuel consumption can be suppressed when the parking time period prediction is performed. In sections 6 to 8, the total fuel consumption is calculated assuming that a fuel consumption required for the catalyst warm-up increases by 0.3 per section, and the fuel consumption required for traveling load increases by 0.5 per section.

In the second modification described above, in a case where a stopping point is set between the starting point and the final destination, the parking time period estimation unit 402 estimates the parking time period at the stopping point, and the travel mode setting unit 404 sets the EV/HV travel mode on the basis of the estimated parking time period and adjusts the catalyst warm-up until reaching the stopping point, and thus, an optimal travel plan including the parking time period can be created and an input of the catalyst warm-up request can be suppressed. According to the second modification, it is possible to reduce the catalyst warm-up request upon leaving the stopping point.

In the above embodiments and the modifications, examples have been described in which the control device 400 of the vehicle 30 appropriately acquires information from the server 20 and estimates the parking time period and the like to create a travel plan, but, for example, processing performed by the control device 400 may be partially performed by the server 20 or the travel plan may be created by the server 20.

In the above embodiments and the modifications, the control device 400 has been described to create one travel plan, but the control device 400 may create a plurality of travel plans having different routes and select therefrom a route satisfying a preset condition, such as a route having a small fuel consumption or a route providing the earlier arrival time.

In the above embodiments and modifications, examples have been described in which a route is created with a current position of the vehicle 30 as the starting point, but a travel plan may be created in which a starting point, stopping point, and destination appropriately set by a user. Furthermore, it is possible to set a starting point, stopping point, and destination which are different from each other, in addition to outward travel from and inward travel to the home 100 as described above.

In a case where a stopping point is set between a starting point and a final destination, the control device, control method, and control program according to the present invention estimate a parking time period at the stopping point and create a travel plan on the basis of the estimated parking time period, and thus, an optimal travel plan can be created even when a vehicle parks at the stopping point.

According to an embodiment, a probability of long time parking at a stopping point is calculated according to whether the plurality of conditions are satisfied/not satisfied to estimate the parking time period on the basis of a result of the calculation, and thus, the parking time period can be estimated further highly accurately.

According to an embodiment, it is possible to accurately predict the traveling load in a travel route and create a travel plan with higher accuracy.

According to an embodiment, engine coolant temperature is adjusted until the vehicle reaches a stopping point on the basis of the parking time period at the stopping point, an input of a heater request during traveling can be suppressed and fuel consumption due to use of the heater can be reduced.

According to an embodiment, catalyst warm-up is adjusted until the vehicle arrives at a stopping point on the basis of the parking time period at the stopping point, an input of a catalyst warm-up request during traveling can be suppressed, and the catalyst warm-up request upon leaving the stopping point can be reduced.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device for a hybrid vehicle, the hybrid vehicle including: an internal combustion engine; a battery which is chargeable/dischargeable; a rotary electric machine which is driven by power supplied from the battery; and an engine coolant temperature sensor that detects a coolant temperature of the internal combustion engine,
the control device being configured to:
create a travel route from a starting point to a destination through a stopping point by referring to map information;
estimate a parking time period of the hybrid vehicle at the stopping point;
predict a traveling load of the hybrid vehicle in each of sections obtained by dividing the travel route by referring to the map information;
set, for each of the sections and based on the parking time period and the traveling load, a traveling mode of (i) an EV mode, in which the battery provides power for traveling as a main power supply, or (ii) an HV mode, in which the internal combustion engine provides the power for traveling as the main power supply, so as to reduce a frequency of a heat request, which is input when the coolant temperature of the internal combustion engine is equal to or less than a predetermined temperature; and
control the hybrid vehicle to travel according to the created travel route and the set traveling modes.

2. The control device for the hybrid vehicle according to claim 1, wherein
the control device is configured (i) to calculate a probability of long time parking, in which the hybrid vehicle is parked for a time period equal to or longer than a predetermined time period, when a plurality of conditions, which are mutually independent from each other, are simultaneously satisfied, and (ii) to estimate the parking time period based on the probability.

3. The control device for the hybrid vehicle according to claim 1, wherein
the map information includes a distance from the starting point to the destination, a road gradient, and a vehicle congestion degree at a time of travel.

4. The control device for the hybrid vehicle according to claim 1, wherein
the control device is configured to predict engine coolant temperature at a time of leaving the stopping point and to set the traveling mode based on a result of the prediction.

5. The control device for the hybrid vehicle according to claim 1, wherein
the control device is configured to predict catalyst temperature at a time of leaving the stopping point and to set the traveling mode based on a result of the prediction.

6. A control method for a hybrid vehicle, the method being performed by a control device for a hybrid vehicle, the hybrid vehicle including: an internal combustion engine; a battery which is chargeable/dischargeable; a rotary electric machine which is driven by power supplied from the battery; and an engine coolant temperature sensor that detects a coolant temperature of the internal combustion engine, the method comprising:
creating a travel route from a starting point to a destination through a stopping point by referring to map information;
estimating a parking time period of the hybrid vehicle at the stopping point;
predicting a traveling load of the hybrid vehicle in each of sections obtained by dividing the created travel route by referring to the map information;
setting, for each of the sections and based on the parking time period and the traveling load, a traveling mode of (i) an EV mode, in which the battery provides power for traveling as a main power supply, or (ii) an HV mode, in which the internal combustion engine provides the power for traveling as the main power supply, so as to reduce a frequency of a heat request, which is input when the coolant temperature of the internal combustion engine is equal to or less than a predetermined temperature; and
controlling the hybrid vehicle to travel according to the created travel route and the set traveling modes.

7. A non-transitory computer readable recording medium storing a control program for a control device of a hybrid vehicle, the hybrid vehicle including: an internal combustion engine; a battery which is chargeable/dischargeable; a rotary electric machine which is driven by power supplied from the battery; and an engine coolant temperature sensor that detects a coolant temperature of the internal combustion engine, the control program causing the control device to execute:
creating a travel route from a starting point to a destination through a stopping point by referring to map information;
estimating a parking time period of the hybrid vehicle at the stopping point;
predicting a traveling load of the hybrid vehicle in each of sections obtained by dividing the created travel route by referring to the map information;
setting, for each of the sections and based on the parking time period and the traveling load, a traveling mode of (i) an EV mode, in which the battery provides power for traveling as a main power supply, or (ii) an HV mode, in which the internal combustion engine provides the power for traveling as the main power supply, so as to reduce a frequency of a heat request, which is input when the coolant temperature of the internal combustion engine is equal to or less than a predetermined temperature; and
controlling the hybrid vehicle to travel according to the created travel route and the set traveling modes.

8. The control device for the hybrid vehicle according to claim 1, wherein
the control device is configured (i) to compare the estimated parking time period of the hybrid vehicle at the stopping point with a threshold value, and when the estimated parking time period is larger than the threshold value, (ii) to set the HV mode in one or more sections within a predetermined range from the stopping point in the travel route from the starting point to the stopping point.

9. The control device for the hybrid vehicle according to claim 8, wherein
the control device is configured to set the threshold value based on whether the engine coolant temperature is lowered to a predetermined temperature before the hybrid vehicle leaves the stopping point.

* * * * *